Oct. 28, 1924.
J. H. COURNYER
CREAM REMOVER
Filed Dec. 2, 1922
1,512,908
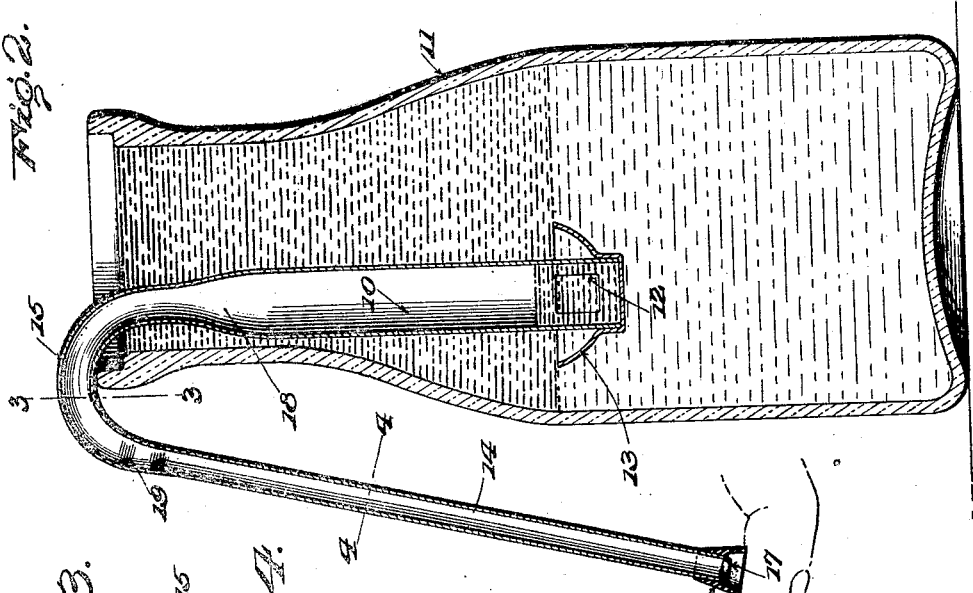
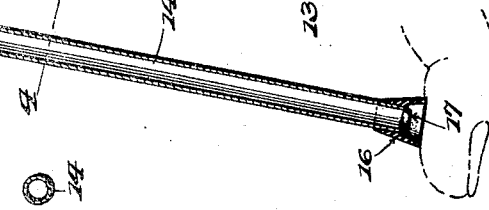
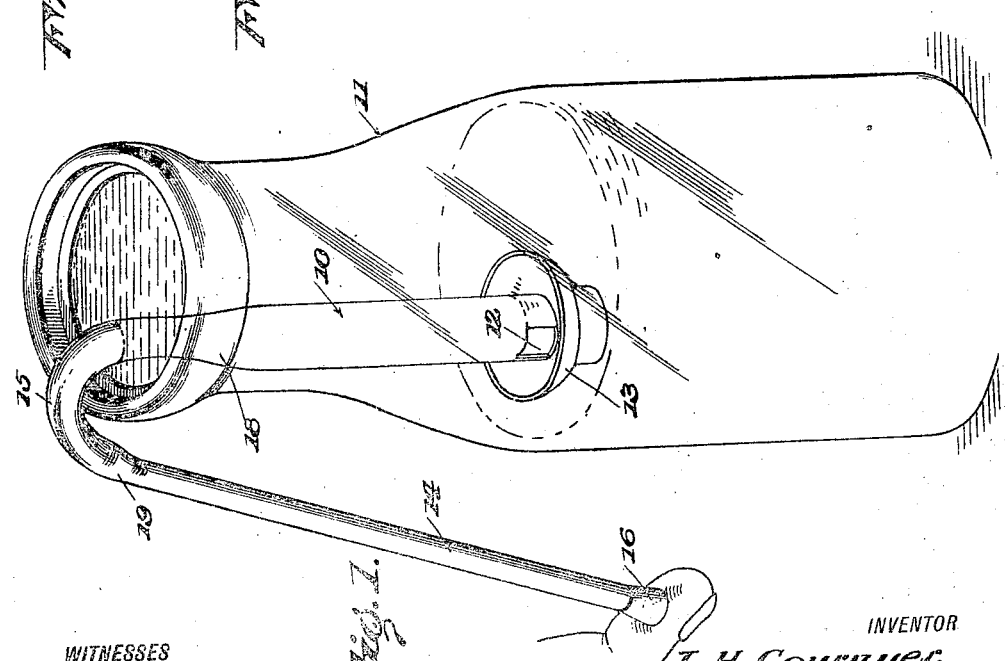
WITNESSES
W. A. Williams.
INVENTOR
J. H. Cournyer.
BY Munn & Co.
ATTORNEYS Patented Oct. 28, 1924.

1,512,908

UNITED STATES PATENT OFFICE.

JAMES HERBERT COURNYER, OF OSKALOOSA, IOWA.

CREAM REMOVER.

Application filed December 2, 1922. Serial No. 604,600.

*To all whom it may concern:*

Be it known that I, JAMES H. COURNYER, a citizen of the United States, and a resident of Oskaloosa, in the county of Mahaska and State of Iowa, have invented certain new and useful Improvements in Cream Removers, of which the following is a specification.

My present invention relates generally to cream removers, and more particularly to a siphon device for removing cream, of the general nature described and claimed in my Patent 1,355,539 dated October 12, 1920, my primary object being the provision of a simple inexpensive arrangement which will be highly sanitary in use, easy to keep clean, economical, and the proper insertion of which within a bottle will in itself bring about automatic starting of the desired siphon action.

In the accompanying drawing which illustrates my present invention and forms a part of this specification, Figure 1 is a perspective view showing the practical application of my invention, Figure 2 is a vertical section taken through both the bottle and the cream remover disposed therein, and Figures 3 and 4 are detail cross sections taken respectively on lines 3—3 and 4—4 of Figure 2.

Referring now to these figures my improved cream remover includes an intake tube 10 adapted for insertion downwardly within a bottle 11 so as to remove by siphon action the cream from the said bottle, the lower end of said intake tube 10 preferably having two intake apertures 12 which open into a cup 13 as in my patent above referred to.

My improved cream remover also includes an outlet tube 14 and a curved tubular connection 15 between the upper ends of the intake and outlet tubes, which connection is preferably of flattened tubular form as particularly seen in Figures 1 and 3, the object of which is to lessen the height the liquid has to be thrown thus giving the skimmer more power, and also causing the instrument to rest more steadily upon the edge of a bottle around its mouth as indicated in Figures 1 and 2. This connection is also preferably of lesser internal area than that of the intake tube 10 and of greater internal area than that of the outlet tube 14, the latter of which is provided at its lower or outer end with a surrounding ferrule 16 which projects therebeyond and forms a finger engaging element so that the outlet end of this tube which is constricted as at 17 and terminates within the ferrule 16, will be untouched by the operator's finger and thus maintained in a sanitary condition at all times.

The upper or inner end of the intake tube 10 has a portion 18 which gradually reduces and merges into one end of the tubular connection 15 for a purpose which will be presently made plain. Similarly the outlet end of the connection 15 where it joins the inner end of the outlet tube 14 is gradually reduced as at 19.

In use the operator's finger is placed over the ferrule 16 so as to close the outer end of the outlet tube and with the device thus closed at its outer end, the intake tube 10 is forced downwardly into the cream within the bottle 11 to the position shown in Figures 1 and 2, or until the curved tubular connection 15 rests upon the upper edge of the bottle. During this downward movement of the intake tube 10 cream will enter the intake apertures 12 and pass upwardly into the intake tube until there is a balance between the pressure of the liquid and the pressure of the air trapped within the upper portion of the intake tube and within the outlet tube and the tubular connection 15. Thus with the device inserted as in Figure 2 it is simply necessary for the operator to remove his finger from the ferrule 16 and the pressure of the cream or liquid causes the same to rush upwardly in the intake tube and enter the tubular connection 15 with an accelerated movement due to the reduced portion 18 and the difference between the cross sections of the intake tube 10 and the tubular connection 15. Likewise as the liquid passes through the tubular connection 15 and into the outlet tube 14, its accelerated movement by virtue of the reduced portion 19 causes it to fully establish the siphon action, while the said reduced portion 19 also serves to cause the liquid to completely fill the cross section of the outlet tube and maintain the vacuum thus formed as long as there is liquid flowing therethrough.

I claim:

1. A cream remover comprising an intake tube and an outlet tube adapted to respectively extend within and outside of a bottle neck, and also including a curved tubular connection between the intake and outlet tubes, said connection being of flattened tubular form and of greater cross sectional area than the outlet tube and less cross sectional area than the intake tube, whereby to lessen the height the liquid has to be thrown and thus give the device more power in starting siphon action, as well as to permit the device to rest steadily upon the upper edge of a bottle into which the intake tube extends.

2. A cream remover of the character specified in claim 1 wherein the intake and outlet tubes and the said tubular connection are formed integral, there being gradually reduced portions between the intake tube and one end of the curved connection and between the other end of the curved section and one end of the outlet tube.

3. A cream remover of the character specified in claim 1 wherein the discharge end of the outlet tube is provided with a ferrule extending therearound and therebeyond adapted to be closed by the application of the finger thereto, the said discharge end being constricted within the ferrule as and for the purpose set forth.

JAMES HERBERT COURNYER.